United States Patent
Tseng

(10) Patent No.: US 7,079,163 B2
(45) Date of Patent: Jul. 18, 2006

(54) METHOD AND SYSTEM OF COLOR-REAL ADJUSTMENT FOR ADJUSTING A DISPLAY DEVICE

(75) Inventor: Shih-Hua Tseng, Taipei (TW)

(73) Assignee: Tatung Co., Ltd., Taipei (TW)

( * ) Notice: Subject to any disclaimer, the term of this patent is extended or adjusted under 35 U.S.C. 154(b) by 30 days.

(21) Appl. No.: 10/939,495

(22) Filed: Sep. 14, 2004

(65) Prior Publication Data

US 2005/0128214 A1    Jun. 16, 2005

(30) Foreign Application Priority Data

Dec. 12, 2003    (TW) ............................... 92135285 A

(51) Int. Cl.
*G09G 5/04*    (2006.01)
(52) U.S. Cl. .................. 345/690; 345/590; 345/600; 345/1.1; 345/3.1; 345/3.3
(58) Field of Classification Search ................... None
See application file for complete search history.

(56) References Cited

U.S. PATENT DOCUMENTS

2002/0024529 A1\*  2/2002  Miller et al. ................. 345/690
2004/0119731 A1\*  6/2004  Lee ............................ 345/699

\* cited by examiner

*Primary Examiner*—Mark Zimmerman
*Assistant Examiner*—Jwalant Amin
(74) *Attorney, Agent, or Firm*—Bacon & Thomas, PLLC

(57) ABSTRACT

A method of color-real adjustment and system for adjusting a display device is disclosed, the system includes a server for outputting an image triggering signal and inputting an image extraction signal, performing a color-real process on the image extraction signal to obtain color data, transforming the color data into a color-real parameter and outputting the color-real parameter; an pattern generator for outputting an image pattern according to the image triggering signal; the display device for displaying an image corresponding according to the image pattern; an digital camera for detecting colors of the displayed image to output the image extraction signal; and a burner for storing the color-real parameter into a memory of the display device, wherein the color-real parameter matches a format of extended display identification data.

5 Claims, 4 Drawing Sheets

METHOD AND SYSTEM OF COLOR-REAL ADJUSTMENT FOR ADJUSTING A DISPLAY DEVICE

BACKGROUND OF THE INVENTION

1. Field of the Invention

The present invention relates to a method and system of color-real adjustment for adjusting a display device.

2. Description of the Related Art

Each display device displays color images according to display color parameters stored in an internal memory. Since the display color parameters stored in various display devices are different, display devices display the same color images with different colors.

Due to the development of the Internet, many companies now display products on their websites, so that a user can browse the website and purchase these products via the Internet. However, each display device presents the same product with different colors, and the colors may be too red, too green or too blue. Consequentially, display devices typically do not present the true coloration of the products, since the user is unable to see the real color of the products, disappointment may be experienced when the actual product is received due to the misrepresentation of the colors, and this is very inconvenient for both the manufacturer and the consumer.

Therefore, it is desirable to provide a method for adjusting a color-real display device and a related system to mitigate and/or obviate the aforementioned problem.

SUMMARY OF THE INVENTION

To avoid the above-mentioned defect, the present invention provides a system of color-real adjustment for adjusting a display device, which comprises: a server for outputting an image triggering signal and inputting an image extraction signal, performing a color-real process on the image extraction signal to obtain color data, transforming the color data into a color-real parameter and outputting the color-real parameter; an pattern generator for outputting an image pattern according to the image triggering signal; the display device for displaying an image corresponding according to the image pattern; an image extraction device for detecting colors of the displayed image to output the image extraction signal; and a burner for storing the color-real parameter into a memory of the display device, wherein the color-real parameter is stored in extended display identification data.

To avoid the above-mentioned defect, the present invention provides a method of color-real adjustment for adjusting a display device, which comprises: (A) outputting an image triggering signal to a pattern generator; (B) outputting an image pattern to the display device; (C) extracting color data according to a displayed image; (D) determining whether a driving voltage of the displayed image is a maximum value; if it is not, increasing the driving voltage of the displayed image; (E) changing the image pattern; (F) determining whether the color data corresponds to a termination; if it does not, performing step (B); (G) transforming the color data into a color-real parameter; and (H) storing the color-real parameter in a memory of the display device, wherein the color-real parameter matches a format of extended display identification data (EDID).

The method and system of color-real adjustment for adjusting a display device adjusts the displayed color of image of the display device to met a color-real standard, and the display device can be a LCD or CRT displayer, PDP or such device. Therefore, the color of each product displayed on each display device will be the same.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
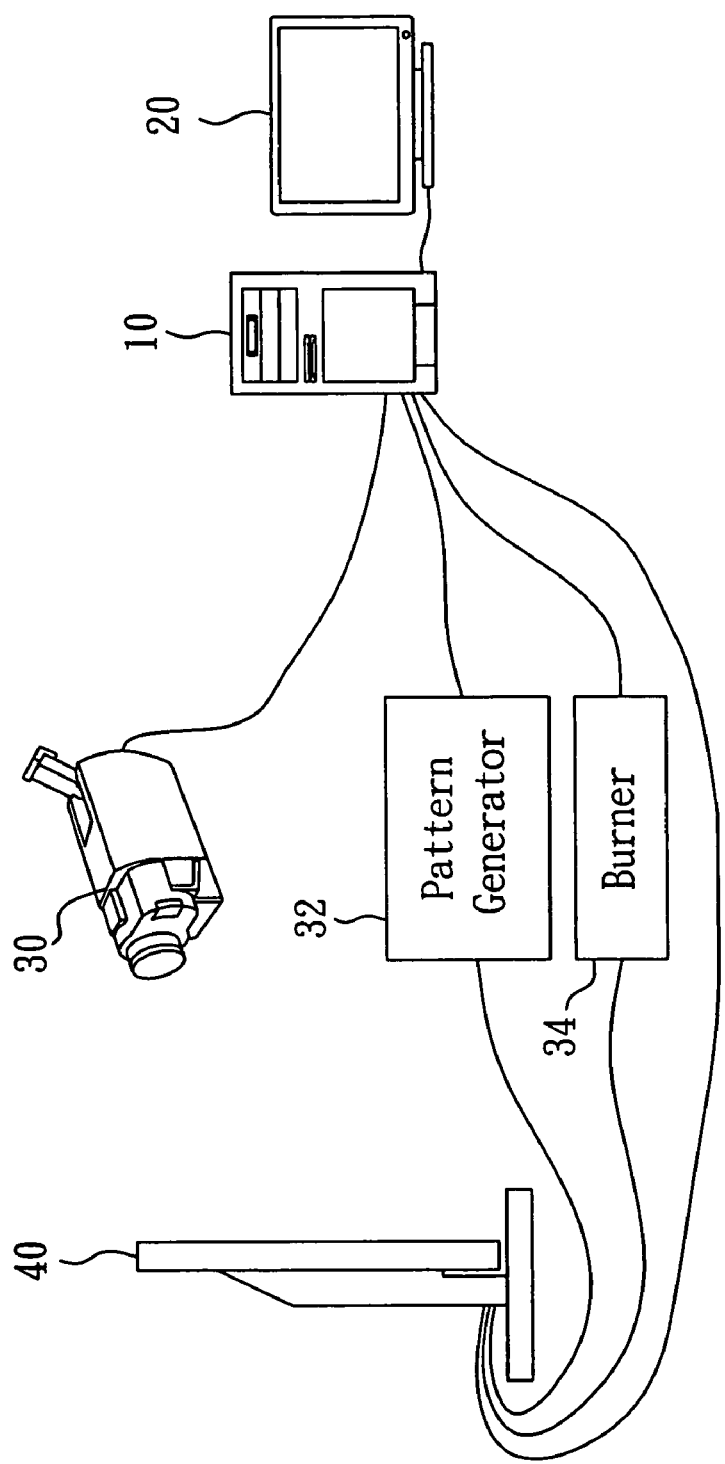
FIG. 1 is a schematic drawing of a system of color-real adjustment for adjusting a display device according to the present invention.

As shown in FIG. 1, a system of color-real adjustment for adjusting a display device of the present invent is shown, wherein a server 10 is connected to a monitor 20, an image extraction device 30, a pattern generator 32, a burner 34, and a display device 40. The pattern generator 32 and the burner 34 are also connected to the display device 40. The image extraction device 30 is preferably a digital camera.

Figure 2:
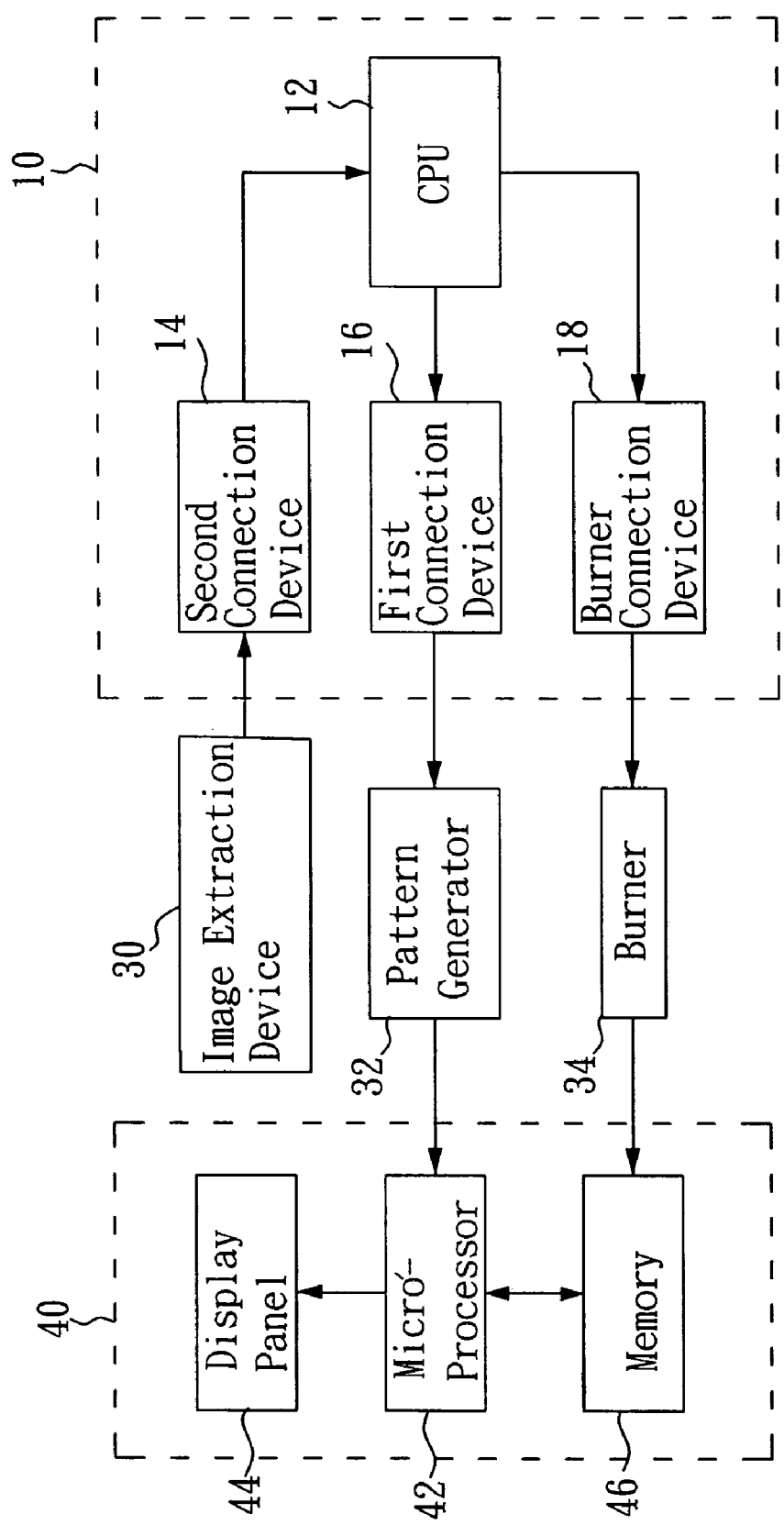
FIG. 2 is a functional block drawing of a system of color-real adjustment for adjusting the display device according to the present invention.

As shown in FIG. 2, the server 10 has a CPU 12, a first connection interface 16, a second connection interface 14, and a burner connection interface 18. The first connection interface 16 would be a RS-232 port (preferably), a USB port, or an Ethernet port, and is connected to the pattern generator 32. The second connection interface 14 would be a RS-232 port (preferably), a USB port, or an Ethernet port, and is connected to the image extraction device 30. The burner connection interface 18 is connected to the CPU 12 via an connection interface (Inter-Integrated Circuit (IIC) is preferable), and which has an output interface such as an RS-232 port (preferable), a parallel connection port, a USB port, or an Ethernet port, and is connected to the burner 34. The burner 34 is adapted to update the data stored in a memory 46 of the display device 40.

Figure 3:
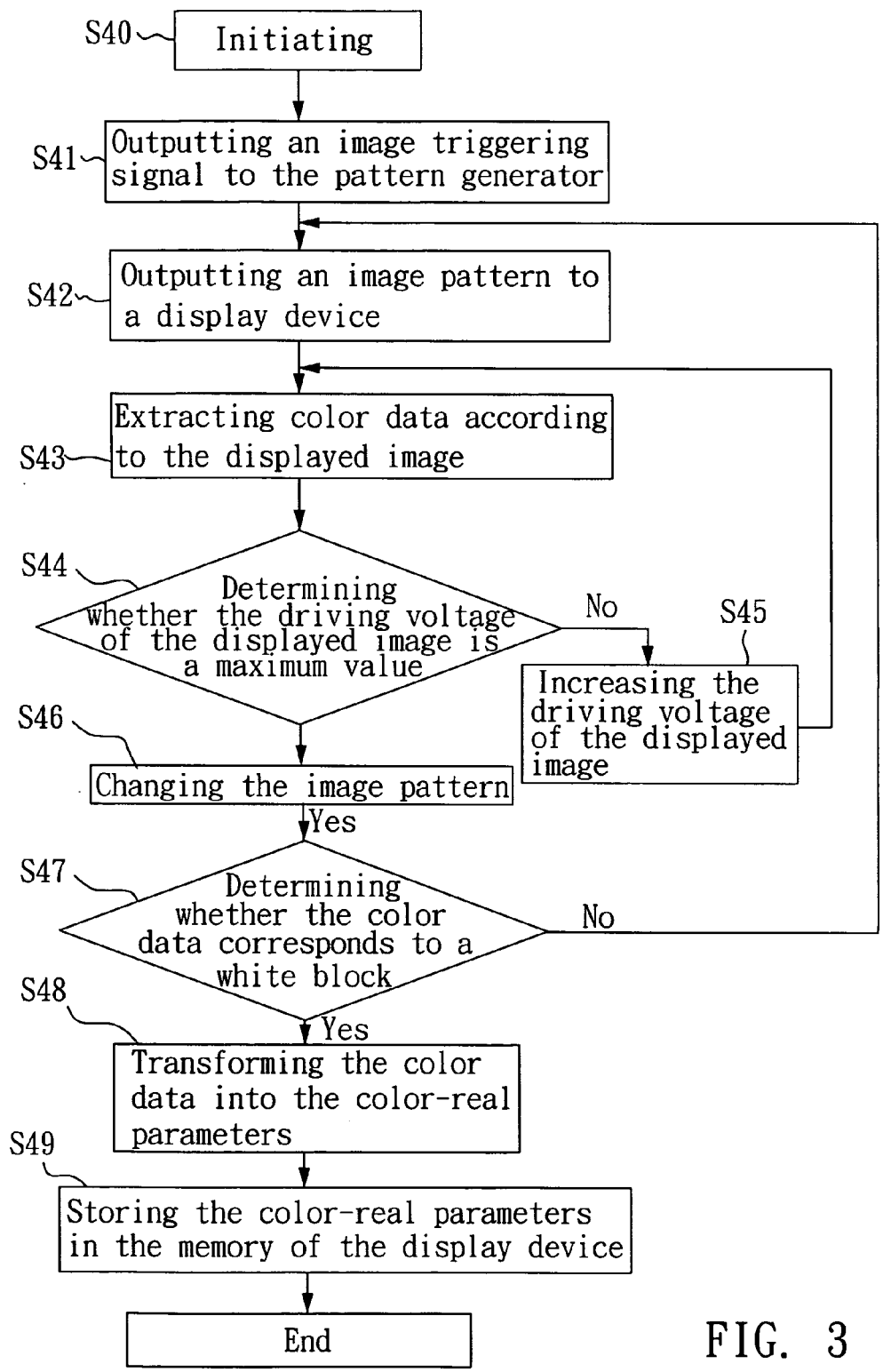
FIG. 3 is a flow chart of a method of color-real adjustment for adjusting the display device according to the present invention.
Figure 4:
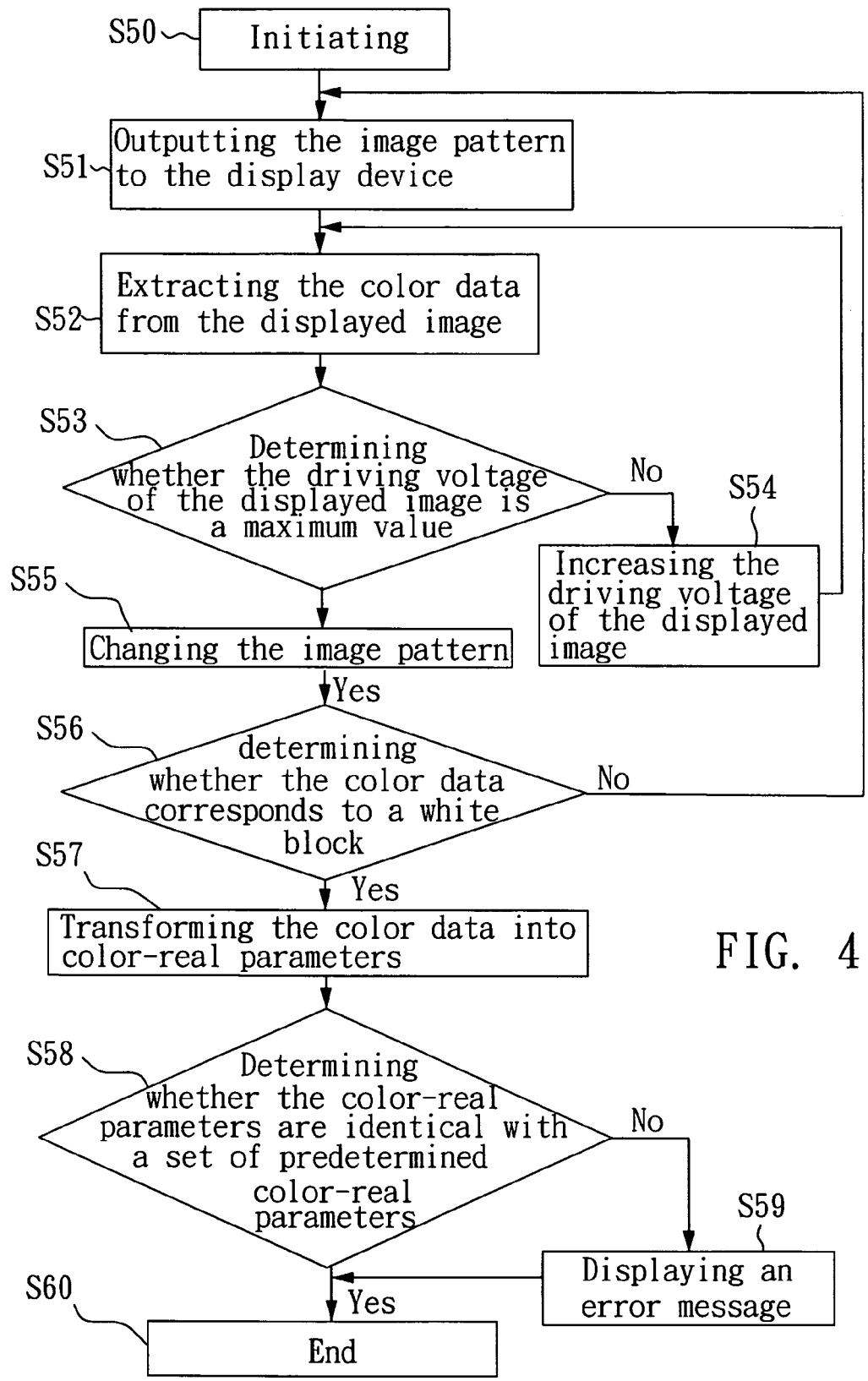
FIG. 4 is a flow chart of a method of color-real examination for examining the display device according to the present invention.

As shown in FIG. 3, a method of color-real adjustment for adjusting the display device comprises the following steps:

Step S40: initiating. The server 10 outputs a reset signal to initiate the image extraction device 30 and the pattern generator 32.

Step S41: outputting an image triggering signal to the pattern generator 32. An image triggering signal output by the CPU 12 of the server 10 transmits to the pattern generator 32 via the second connection interface 14.

Step S42: outputting an image pattern to a display device 40. When the pattern generator 32 receives the image triggering signal and then generates different image patterns to a microprocessor 42 of the display device 40 sequentially, or outputs an image pattern corresponding to the image triggering signal to the microprocessor 42. The microprocessor 42 drives a display panel 44 according to the image pattern and display color parameters stored in the memory 46, so that the image displayed by the display panel 44 corresponds to the image pattern. The pattern generator 32 is a standard and well-known image output device that generates different image patterns corresponding to different images including a red block, a green block, a blue block, or a white block.

Step S43: extracting color data according to a displayed image. Since the display panel 44 displays the image, the image extraction device 30 extracts and output an image extraction signal corresponding to the displayed image to the CPU 12 via the second connection interface 14. The CPU 12 performs a color data process to the image extraction signal to extract color data. For example, the images are a red block, a green block, and a blue block sequentially, then the CPU 12 gets three sets of color data corresponding to the red, green and blue colors respectively. When the image extraction signal corresponds to color data for white, the CPU 12 stops the procedure of the color data process, determines color-real parameters corresponding to the three sets of color data according to a color-real standard, and outputs the color-real parameters to the burner 34 via a burner connection interface 18.

Step S44: determining whether the driving voltage of the displayed image is a maximum value; if it is, step S46 is performed. When the pattern generator 32 outputs different image patterns to the display device 40, the display device 40 displays the images with different driving voltages. A step-by-step driving method is utilized for modulating the drive voltage of the displayed images. For example, when the pattern generator 32 outputs a first image pattern to the display device 40, the driving voltage is 0 volt (an initial value); after the image extraction device 30 extracts the image extraction signal, 0.1 volt is added to the driving voltage each time to display the image until the driving voltage reaches 0.7 volt (the maximum value). However, the range of modulation of the driving voltage may vary based on the demand of the user.

Step S45: increasing the driving voltage of the displayed image. The driving voltage of the displayed image is increased as described in step S44.

Step S46: changing the image pattern. Since the displayed images of this embodiment are a red block, a green block, a blue block and white block sequentially. If the displayed image corresponding to the red block at 0.7 volt, the pattern generator 32 outputs the next image pattern to the display device 40, then the display device 40 drives the displayed image corresponding to the green block at 0 volt, and so on.

Step S47: determining whether the color data corresponds to a white block; if it does, step S48 is performed. Since this embodiment considers the white block as an indicator to stop the procedure of the color data process, the CPU 12 must analyze the color data to determine whether or not to proceed the color data process.

Step S48: transforming the color data into the color-real parameters. According to a predetermined transformation formula, each set of color data can be transformed into color-real parameters.

Step S49: storing the color-real parameters in the memory 46 of the display device 40. The burner 34 burns the color-real parameters into the memory 46 of the display device 40. Afterwards, the microprocessor 42 drives the display panel 44 according to the color-real parameters. Since the color-real parameters match the color-real standard, the colors of displayed images also match the color-real standard. Therefore, each display device displays the same product with the same colors. The color-real parameters are stored in the EDID.

After the display device 40 has accomplished modification of the color-real parameters, a user can use a method of color-real examination for examining a display device of the present invention to examine the color of the displayed image on the display device 40. Since the method of real-color examination for examining a display device of the present invention is similar to the method of color-real adjustment for adjusting a display device of the present invention, only the differences will be described in detail as followings:

Step S50: initiating. The server 10 outputs a reset signal to initiate the image extraction device 30 and the pattern generator 32.

Step S51: outputting an image pattern to a display device 40.

Step S52: extracting color data according to a displayed image.

Step S53: determining whether the driving voltage of the displayed image is a maximum value; if it is, step S55 is performed.

Step S54: increasing the driving voltage of the displayed image.

Step S55: changing the displayed image.

Step S56: determining whether the color data corresponds to a white block; if it does, step S57 is performed.

Step S57: transforming the color data into color-real parameters.

Step S58: determining whether the color-real parameters are identical with predetermined color-real parameters; if they are, step S60 is performed. Since the memory 46 of the display device 40 stores a set of color-real parameters (the predetermined color-real parameters), when the Step S57 is accomplished, the CPU 12 obtains another set of color-real parameters and compares this set of color-real parameters with the predetermined color-real parameters. If these two sets of color-real parameters are identical (or under a predetermined error tolerance), the colors of the displayed image of the display device 40 match the color-real standard, therefore step S60 is performed; otherwise, step S59 is performed.

Step S59: displaying an error message. The monitor 20 can be used to display an error message or a pass message to tell the engineer or examiner the result of Step S58. If the set of color-real parameters is different from the predetermined set of color-real parameters, then this indicates that the colors of the displayed images are incorrect or the display device 40 is a defective product that is incapable of showing correct colors. Afterwards, a technician of examiner can repair the display device 40 according to the error message display on the monitor 20.

Step S60: end.

The present invention discloses a method of color-real adjustment for a display device and a system of color-real adjustment for a display device to drive the display device matching the color-real standard, and stores the color-real parameters into the display device 40. Additionally, a method of color-real examination for a display device can be used for examining the colors displayed on the display device 40 to ensure the colors of the displayed images match the color-real standard.

Although the present invention has been explained in relation to its preferred embodiment, it is to be understood that many other possible modifications and variations can be made without departing from the spirit and scope of the invention as hereinafter claimed.

What is claimed is:

1. A method of color-real adjustment for adjusting a display device, comprising:
   (A) outputting an image triggering signal to a pattern generator;

(B) outputting an image pattern to the display device;
(C) extracting color data according to a displayed image;
(D) determining whether a driving voltage of the displayed image is a maximum value; if it is not, increasing the driving voltage of the displayed image;
(E) changing the image pattern;
(F) determining whether the color data corresponds to a termination; if it does not, performing step (B);
(G) transforming the color data into a color-real parameter; and
(H) storing the color-real parameter in a memory of the display device,
wherein the color-real parameter matches a format of extended display identification data (EDID).

2. The method of color-real adjustment as claimed in claim 1, wherein the image pattern corresponds to a red, blue, green or white block sequentially.

3. The method of color-real adjustment as claimed in claim 1, wherein a initiating value of the driving voltage of the displayed image is 0 volt.

4. The method of color-real adjustment as claimed in claim 3, wherein the driving voltage of the displayed image is incremental by 0.1 volt each time, and a maximum value of the driving voltage is 0.7 volt.

5. The method of color-real adjustment as claimed in claim 1, wherein the memory is an EEPROM.

* * * * *